United States Patent [19]

Fuse

[11] Patent Number: 4,970,361
[45] Date of Patent: Nov. 13, 1990

[54] OPENING-DEGREE DETECTING APPARATUS FOR WELDING GUN

[75] Inventor: Genzo Fuse, Sayama, Japan

[73] Assignee: Honda Giken Kogyo Kabushiki Kaisha, Tokyo, Japan

[21] Appl. No.: 325,791

[22] Filed: Mar. 20, 1989

[30] Foreign Application Priority Data

Apr. 5, 1988 [JP] Japan ............................. 63-46050[U]

[51] Int. Cl.⁵ ............................................. B23K 11/25
[52] U.S. Cl. ................................... 219/86.41; 219/110
[58] Field of Search .............................. 219/86.41, 110

[56] References Cited

U.S. PATENT DOCUMENTS 3,417,221 12/1968 Hayward ............................. 219/110
4,317,980 3/1982 Goodrich et al. .................. 219/110
4,841,113 6/1989 Hamada et al. .................... 219/110

FOREIGN PATENT DOCUMENTS 48-25014 3/1948 Japan .
85/05585 12/1985 PCT Int'l Appl. .

Primary Examiner—Clifford C. Shaw
Attorney, Agent, or Firm—Armstrong, Nikaido, Marmelstein, Kubovcik & Murray

[57] ABSTRACT

A displacement detector is attached to the pressure cylinder which operates scissored gun arms to open and close the welding gun instead of being attached directly to the arms and measures displacement of the piston rod. An optical distance sensor mounted on the front cover of the cylindr is disposed to face the piston and determine the distance thereto. Alternatively, a linear moving type potentiometer can be mounted outside the cylinder having its slider connected to the piston rod.

4 Claims, 3 Drawing Sheets

OPENING-DEGREE DETECTING APPARATUS FOR WELDING GUN

BACKGROUND OF THE INVENTION

This invention relates to detecting apparatus for a welding gun to detect the degree of opening thereof, more specifically, to a detecting apparatus for a welding gun of the type in which a pair of arm holders provided for holding a pair of gun arms are pivotally supported on a gun bracket and the piston rod of a pressure cylinder attached to one of the arm holders is connected to the other arm holder so that the gun arms of the welding gun may be opened and closed by operation of the pressure cylinder and the degree of opening detected.

A conventional apparatus has been known as disclosed in the Japanese Unexamined Utility Model Registration Application Publication, Jikkai Sho 48-25014, in which a displacement detector is disposed between a pair of gun arms so as to detect the degree of opening from the relative displacement of the two gun arms with respect to each other.

In the foregoing type of opening-degree detecting apparatus, electric current is applied to the workpiece clamped between electrode tips attached to the front ends of a pair of gun arms of the welding gun. Thereafter, the amount of penetration into the workpiece of the electrode tips is measured from the degree of opening of the gun arms which is detected on the basis of output from the displacement detector in order to determine whether the amount of penetration is larger or smaller than the allowable value, whereby an abnormal or defective welding (such as holing) is detected.

In order to restrain spatter during welding from occurring, it is desired to control the welding current on the basis of the degree of opening of the welding gun, this degree of opening varying in accordance with the melting state of the workpiece. However, if a displacement detector is disposed between a pair of gun arms as in the foregoing material, the displacement detector is affected by the electromagnetic field produced by electric current flowing through the gun arms and therefore fails to operate normally when the gun arms are energized. For this reason, it is much desired to develop a detecting apparatus capable of accurately detecting the degree of opening of the welding gun even when the gun is energized.

In a welding gun which opens and closes a pair of gun arms thereof using a pressure cylinder attached to the arm holders, each gun arm is attached to each arm holder via an insulation material interposed therebetween or the pressure cylinder is attached to the arm holder via an insulation material interposed therebetween in order to prevent the gun arms from becoming shortcircuited when they are energized. Therefore, no current is flowing in the portion where the pressure cylinder is located, so that the intensity of electromagnetic field reaching the location of the pressure cylinder is much lower than that around the gun arms themselves.

In view of the foregoing, the present invention has for its object to provide a detecting apparatus capable of accurately detecting the degree of opening of the welding gun even when the gun is energized.

SUMMARY OF THE INVENTION

To achieve the above object, the present invention provides an opening-degree detecting apparatus for a welding gun of the type in which a pair of arm holders for holding a pair of gun arms are pivotally supported on a gun bracket, and the piston rod of a pressure cylinder attached to one of the arm holders is connected to the other arm holder so that the gun arms of the welding gun may be opened and closed by operation of the pressure cylinder. The inventive apparatus is characterized in that a displacement detector is attached to the pressure cylinder so as to detect displacement of the piston rod.

In this apparatus, the displacement detector may comprise an optical distance sensor disposed to face the piston in the pressure cylinder, in which case the optical distance sensor is better attached to the front cover of the pressure cylinder, the front cover permitting the piston rod to be inserted therethrough. The displacement detector can also comprise a linear moving type potentiometer having a slider connected to the piston rod.

Since a pair of the gun arms are opened and closed by movement of the piston rod of the pressure cylinder, magnitude of displacement of the piston rod serves as a parameter representing the degree of opening of the welding gun, so that the degree of opening of the gun is learned from an output of the displacement detector which detects displacement of the piston rod. Furthermore, the displacement detector is provided on the pressure cylinder and the electromagnetic field reaching the location of the pressure cylinder is, as mentioned in the foregoing, not so strong that the degree of opening of the welding gun can be detected accurately even when the gun is energized.

When the displacement detector is arranged to comprise an optical distance sensor as described above, displacement of the piston rod is detected from the distance of the piston with respect to the sensor. When the displacement detector is a linear moving type potentiometer as described in the foregoing, displacement of the piston rod is detected directly from movement of the slider connected to the piston rod.

In addition, when the optical distance sensor is employed, displacement of the piston rod can be detected with high accuracy free of the outside influences right in the interior of the pressure cylinder which is shut off from the outside.

When the sensor is attached to the front cover of the pressure cylinder, the portion of the cover having the sensor mounted thereon may project in the cylinder's axial line direction without causing the size of the welding gun to be increased due to addition of a displacement detector, in that the projecting portion is accommodated in what is originally or normally a dead space around the piston rod and therefore, does not affect the external shape of the welding gun as a whole.

With the linear moving type potentiometer employed, an increase in the size of the welding gun can also be prevented due to addition of a displacement detector because the potentiometer can be provided in a space around the piston rod.

BRIEF DESCRIPTION OF THE DRAWINGS

The above and other objects and the attendant advantages of the present invention will become readily apparent by reference to the following detailed description when considered in conjunction wit accompanying drawings wherein.

DETAILED DESCRIPTION OF PREFERRED EMBODIMENTS

Figure 1:
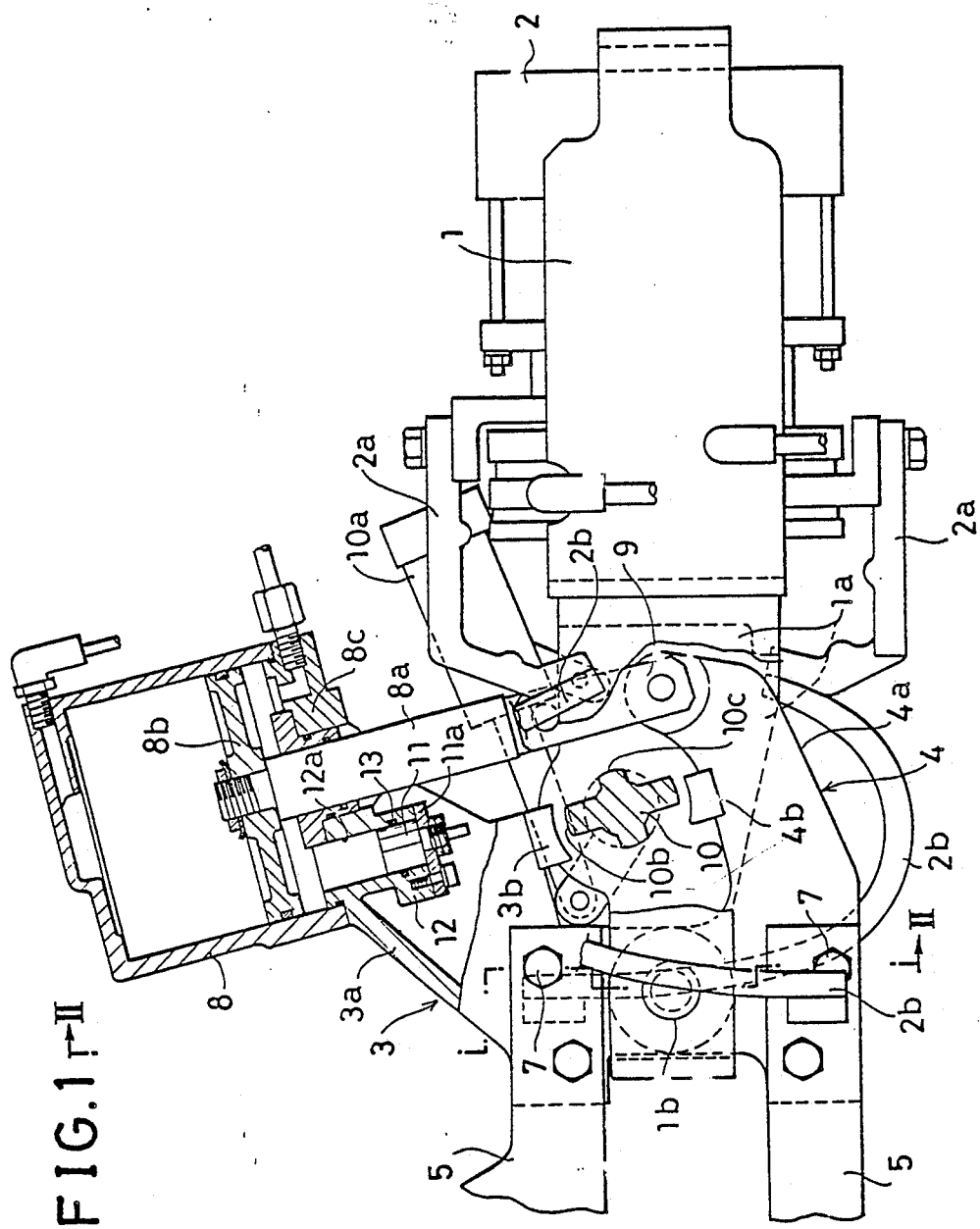
FIG. 1 is a partially sectional side view of one example of a welding gun equipped with the apparatus according to the present invention.
Figure 2:
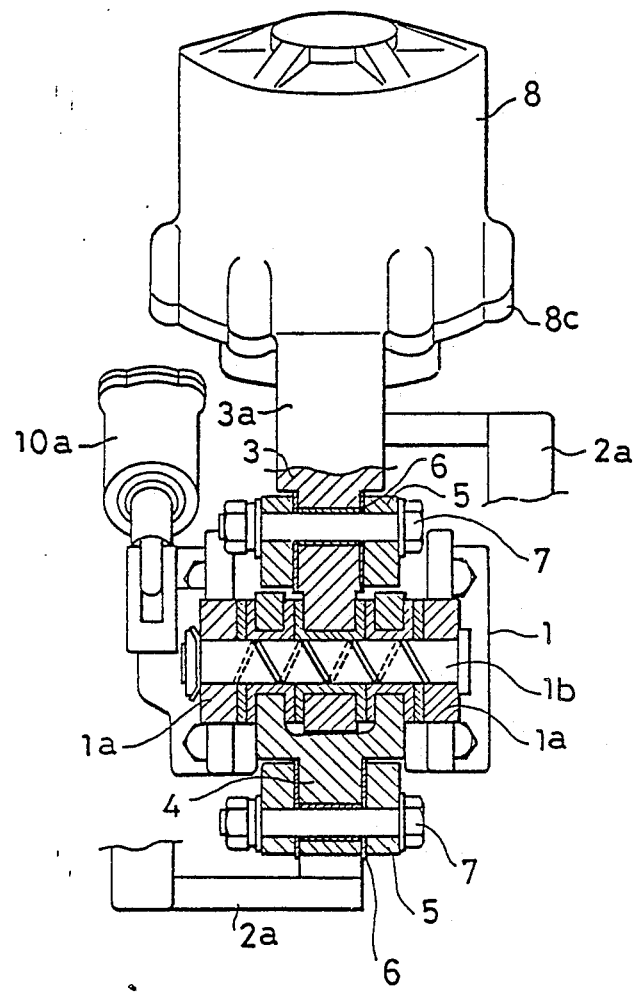
FIG. 2 is a sectional front view taken along the line II—II in FIG. 1.

Referring to FIGS. 1 and 2, a gun bracket 1 is provided with a transformer 2 fitted to the rear portion thereof. A shaft 1b is laterally installed between left and right side walls 1a, 1a of the front portion of the bracket 1. Pivotally supported on the shaft 1b are a pair of upper and lower arm holders 3, 4. The rear end of a gun arm 5 is fastened to each of the arm holders 3, 4 by a bolt 7 via an insulation material 6. Each secondary terminal 2a of the transformer 2 is connected to each gun arm 5 through an ounce copper plate 2b.

A pressure cylinder 8 is attached to a lever portion 3a extending rearwards of the upper arm holder 3. The lever portion is in the shape of a recumbent U, that is shaped, in a horizontal sectional view. The piston rod 8a of the cylinder 8 is connected through a link 9 to a lever portion 4a extending from the lower arm holder 4. The pair of the gun arms 5, 5 are caused to swing to the closing side by an expansion movement downward of the piston rod 8a and swing to the opening side by a contraction movement upward of the piston rod 8a. A stopper member 10 is provided between the side plates 1a, 1a of the gun bracket 1 and is located in a space between the surfaces facing each other of support seats 3b, 4b securely attached respectively to the lever portions 3a, 4a of the arm holders 3, 4. The stopper member 10 is turnable by means of a cylinder 10a. The stopper member 10 is provided with two different stopper surfaces 10b, 10c which are different from each other in height so that the degree of opening of the welding gun at the time when the gun is being released or opened may be selectively varied to either of two amounts, one larger than the other, by rotating the stopper member 10.

The pressure cylinder 8 is provided with a displacement detector which detects displacement of the piston rod 8a. In this first embodiment, the displacement detector comprises an optical distance sensor 11 disposed to face a piston 8b in the cylinder 8. The detector is attached to a front cover 8c located on the lower side of the pressure cylinder 8, the piston rod 8a being inserted through the front cover. The front cover 8c is constructed integrally with the lever portion 3a. A sensor-attaching portion 12 is formed on the front cover 8c which sticks out inside the lever portion 3a. The sensor 11 with a flange plate 11a attached to the lower end thereof is inserted into a through-hole 12a from below and the flange plate 11a is fastened to the lower end of the sensor-attaching portion 12 by at least one screw.

A fluid is supplied to the lower chamber of the pressure cylinder 8 when the gun is being opened. The fluid pressure is low enough that sufficient sealing can be obtained simply by having the sensor-attaching portion 12 provided internally with an O ring 13 into which the sensor 11 is fitted.

The sensor 11 detects a distance of up to the lower surface of the piston 8b, with that surface reflecting rays of light from the sensor 11. Based on output thereof, it measures displacement of the piston rod 8a, that is, the degree of opening of the welding gun which is in a fixed relationship therewith.

Figure 3:
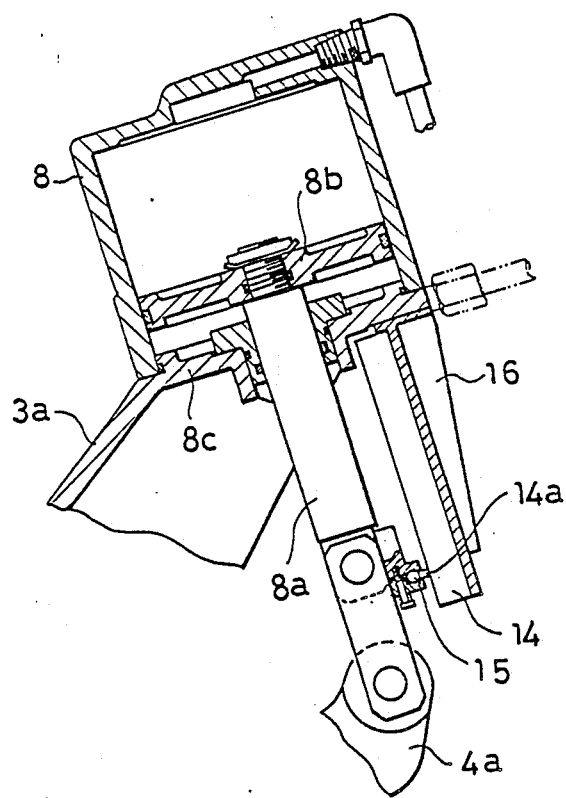
FIG. 3 is a sectional side view of the important portion of a variation example of the apparatus according to the present invention.

FIG. 3 shows another embodiment, wherein a linear moving type potentiometer 14 serving as a displacement detector is attached to the underside surface of the front cover 8c of the pressure cylinder 8 in a manner to extend along the piston rod 8a. The slider 14a of the potentiometer is connected to the lower end of the piston rod 8a via a spherical joint 15, so that displacement of the piston rod 8a can be detected directly by the potentiometer 14. A bracket 16 for mounting the potentiometer fixed to the front cover 8c.

Although in the above embodiments, each gun arm 5 is attached to each of the arm holders 3, 4 via the insulation material 6. This invention can also apply to a welding gun which a pressure cylinder is attached to an arm holder via an insulation material and electric current is applied to the gun arm through the arm holder.

As is clear from the foregoing description, according to the present invention, a displacement detector which detects displacement of the piston rod of a pressure cylinder is attached to the pressure cylinder and the degree of opening of a welding gun is detected from output of the detector. This arrangement, which is different from the prior art in which a displacement detector is attached directly to a gun arm, makes it possible to accurately detect the opening degree of the welding gun even when the gun is being energized, such being not possible with the conventional one.

When the displacement detector is arranged to comprise an optical distance sensor disposed to face the piston in the pressure cylinder, the degree of opening of the gun can be detected with high accuracy free of influences from outside. When the sensor is attached to the front cover of the pressure cylinder, the sensor can be incorporated snugly in the welding gun by making the best use of a dead space therein.

When the displacement detector is arranged to comprise a linear moving type potentiometer having a slider connected to the piston rod, the potentiometer can also be snugly built into the welding gun by efficiently utilizing a dead space therein.

It is readily apparent that the above-described invention has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A degree of opening detecting apparatus for a welding gun of the type in which a pair of arm holders for holding a pair of gun arms are pivotally supported on a gun bracket and the piston rod of a pressure cylinder attached to one of the arm holders is connected to the other arm holder so that the gun arms of the welding gun may be opened and closed by operation of the pressure cylinder, said apparatus comprising a displacement detector attached to the pressure cylinder so as to detect displacement of the piston rod.

2. An apparatus for a welding gun as set forth in claim 1, wherein the displacement detector comprises an optical distance sensor disposed to face the piston in the pressure cylinder.

3. An apparatus for a welding gun as set forth in claim 2, wherein the pressure cylinder includes a front cover permitting the piston rod to be inserted therethrough and the optical distance sensor is attached to the front cover of the pressure cylinder.

4. An apparatus for a welding gun as set forth in claim 1, wherein the displacement detector comprises a linear moving type potentiometer having a slider connected to the piston rod.

* * * * *